US011640060B2

(12) United States Patent
Yamaguchi et al.

(10) Patent No.: US 11,640,060 B2
(45) Date of Patent: May 2, 2023

(54) HEAD-MOUNTED DISPLAY

(71) Applicant: SEIKO EPSON CORPORATION, Tokyo (JP)

(72) Inventors: Tokito Yamaguchi, Azumino (JP); Masayuki Takagi, Azumino (JP); Toshiaki Miyao, Chino (JP); Akira Komatsu, Tatsuno-Machi (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 224 days.

(21) Appl. No.: 17/082,003

(22) Filed: Oct. 27, 2020

(65) Prior Publication Data

US 2021/0132388 A1 May 6, 2021

(30) Foreign Application Priority Data

Oct. 31, 2019 (JP) .............................. JP2019-198375

(51) Int. Cl.
*G02B 27/01* (2006.01)
*G02B 3/00* (2006.01)
*G02B 27/14* (2006.01)

(52) U.S. Cl.
CPC ........... *G02B 27/0172* (2013.01); *G02B 3/00* (2013.01); *G02B 27/14* (2013.01); *G02B 2003/0093* (2013.01); *G02B 2027/0112* (2013.01)

(58) Field of Classification Search
CPC ...... G02B 27/0172; G02B 3/00; G02B 27/14; G02B 2003/0093; G02B 2027/0112; G02B 5/201
USPC ........................... 359/890, 630, 491.01, 590
See application file for complete search history.

(56) References Cited

U.S. PATENT DOCUMENTS

| 3,443,858 | A | * | 5/1969 | La Russa | G02B 27/28 359/489.07 |
| 3,679,297 | A | * | 7/1972 | Searle | G02B 27/01 359/635 |
| 3,736,050 | A | * | 5/1973 | Bolum | H01J 29/898 348/835 |
| 5,715,023 | A | * | 2/1998 | Hoppe | G02B 27/0172 349/11 |
| 2004/0014504 | A1 | * | 1/2004 | Coates | G02B 27/281 455/566 |

FOREIGN PATENT DOCUMENTS

| JP | 2004322380 A | * | 11/2004 |
| JP | 2011221376 | | 11/2011 |

* cited by examiner

*Primary Examiner* — George G. King
(74) *Attorney, Agent, or Firm* — JCIPRNET

(57) ABSTRACT

A head-mounted display includes an image display device including a panel unit serving as a display element configured to display an image, a colored optical member disposed on a light path of imaging light emitted from the panel unit and having a yellowness of a predetermined value or greater, and a coloring correction optical member configured to correct a degree of coloring of the imaging light of the entire light path in accordance with the yellowness of the colored optical member.

10 Claims, 12 Drawing Sheets

HEAD-MOUNTED DISPLAY

The present application is based on, and claims priority from JP Application Serial Number 2019-198375, filed Oct. 31, 2019, the present disclosure of which is hereby incorporated by reference herein in its entirety.

BACKGROUND

1. Technical Field

The present invention relates to a head-mounted display (HMD) configured to present an image to a user.

2. Related Art

A head-mounted display (HMD) mounted on a head of a user (observer) needs to be compact in size while providing an image having a wide angle of view. For this reason, applying a member having a high refractive index to the optical system is desirable. However, when a member having a yellowish color is applied, the entire image becomes tinged with yellow as is. In response, as illustrated in JP-A-2011-221376, for example, there is known a surface light source device in which light is transmitted through a prism sheet having a high refractive index, thereby correcting the yellowish shift that occurs.

Nevertheless, in JP-A-2011-221376, specific configurations, conditions, and the like for enabling application of such a device to a head-mounted display (HMD) are not disclosed.

SUMMARY

A head-mounted display according to an aspect of the present disclosure includes a display element configured to display an image, a colored optical member disposed on a light path of imaging light emitted from the display element and having a yellowness of a predetermined value or greater, and a coloring correction optical member configured to correct a degree of coloring of the imaging light of the entire light path in accordance with the yellowness of the colored optical member.

DESCRIPTION OF EXEMPLARY EMBODIMENTS

First Exemplary Embodiment

Below, an example of a head-mounted display (HMD) according to a first exemplary embodiment of the present disclosure will be described in detail with reference to FIG. 1.

Figure 1:
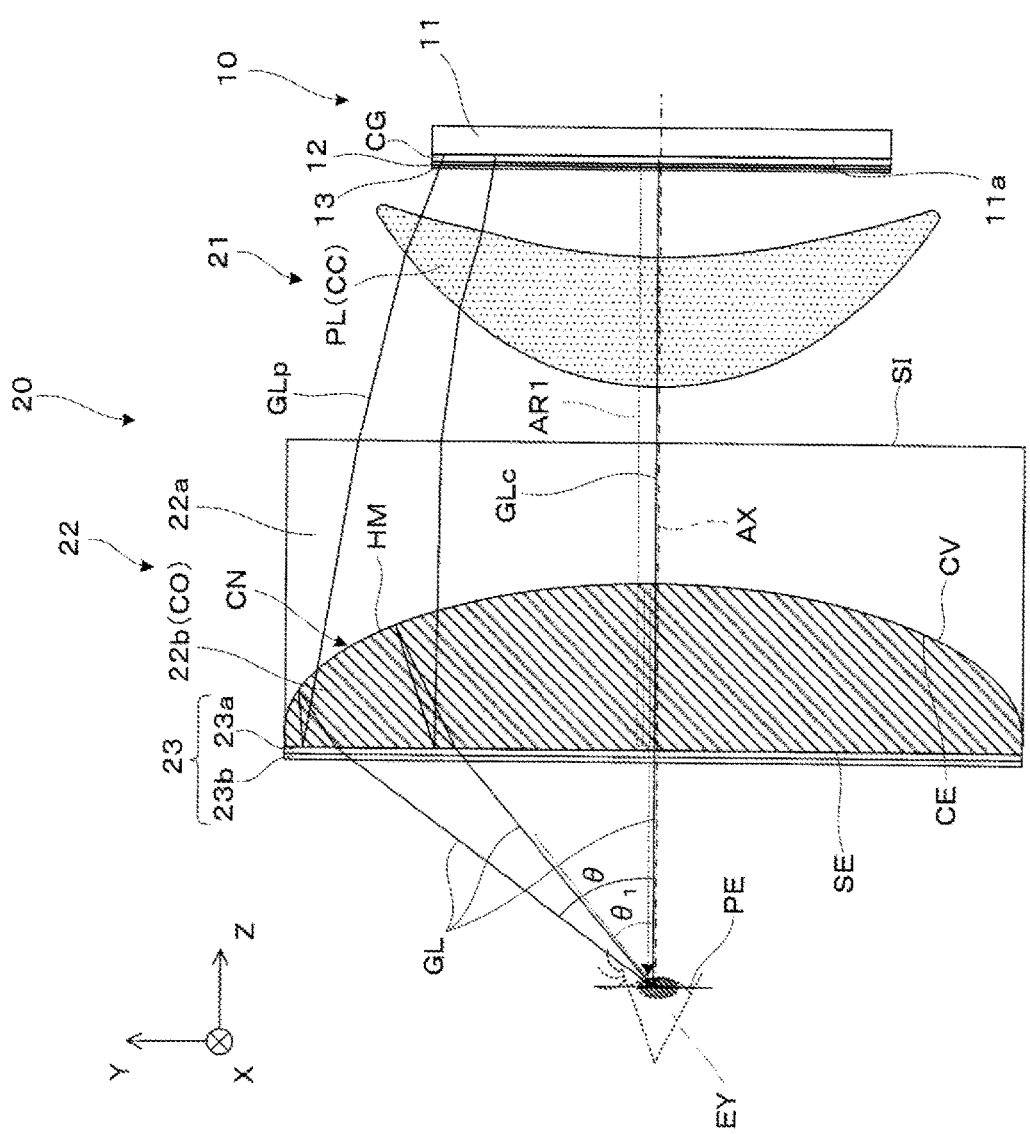
FIG. 1 is a side cross-sectional view for conceptually describing a head-mounted display (HMD) according to a first exemplary embodiment.

As conceptually illustrated in FIG. 1, a head-mounted display 100 according to this exemplary embodiment includes an image display unit 10 constituted by a display element (image display unit) and the like, and an enlargement optical system 20, and serves as a virtual image display device capable of causing a user or an observing wearing the HMD 100 to visually recognize imaging light (image light) by a virtual image. Here, FIG. 1 conceptually illustrates a state of a cross section as viewed from a side when the user is wearing the HMD 100. It is assumed in FIG. 1 and the like that an optical axis AX of an optical system in the HMD 100 is a Z direction. Further, among in-plane directions of a surface orthogonal to the Z direction, a horizontal direction, that is, a right-left direction is an X direction, and among the in-plane directions, a direction orthogonal to the X direction is a Y direction. In this case, a horizontal direction assumed to be a direction in which the right and left eyes of the user are aligned is the X direction. Then, an up-down direction for the user which is a direction orthogonal to the horizontal direction is a vertical direction, and is the Y direction in FIG. 1 and the like. Further, in FIG. 1, assumed as the position of an eye EY of the user during use of the HMD 100 (during observation using the HMD 100) is a position PE of a pupil in the configuration of the HMD 100. Further, here, as illustrated, a direction from the position PE of the pupil toward the image display device 10, that is, a line-of-sight direction for the eye EY of the user is a +Z direction.

Note that the image display device 10 and the enlargement optical system 20 are prepared for each of the right eye and the left eye and are in a right-left pair configuration. Here, however, because a structure of a left side and a structure of a right side are symmetric, only one side (for the right eye) of the right and left sides is illustrated, and the other side is omitted. For example, in FIG. 1, an ear (right ear) is in a −X direction and a nose is in a +X direction from the eye EY of the user. Note that, in the HMD 100, only one of the right-left pair also functions as the virtual display device, that is, functions independently. Additionally, the virtual image display device can also be configured for a single eye without the right-left pair configuration.

An example of a structure and the like of each unit configured to guide imaging light by the HMD 100 will be described conceptually below.

First, the image display device 10 of the HMD 100 includes a panel unit 11 that serves as a main body portion for image formation and is configured to emit imaging light GL, and a cover glass CG configured to cover a light-emitting surface 11a of the panel unit 11. Note that, in addition to the above, the image display device 10 includes a polarization plate 12 and an incident-side polarization conversion member 13, and adjusts a polarization state of the imaging light (image light) GL emitted from the panel unit 11. Further, in the image display device 10, a small unit is employed as the panel unit and, as illustrated, the image display device 10 is configured to be smaller than at least the enlargement optical system 20 with respect to a direction orthogonal to the optical axis AX. Specifically, for example, in the example illustrated, a size of an image display area of the image display device 10 is smaller than a size of each lens constituting the enlargement optical system 20 described later.

The panel unit 11 being a display device can be a display element (image display element) including a self-light-emitting type element (organic light-emitting diode (OLED)) such as an organic electro-luminescent (EL) element, for example. The panel unit 11 may be, for example, a self-light-emitting type display element (image element) represented by an inorganic EL element, a light-emitting diode (LED) array, a laser array, a quantum dot light-emitting element, and the like in addition to the organic EL element. The panel unit 11 forms a still image or a moving image in color in the light-emitting surface 11a having two dimensions. The panel unit 11 is driven by a drive control circuit (not illustrated) to perform a display operation. When an organic EL display is used as the panel unit 11, the panel unit 11 includes an organic EL control unit. When a quantum dot display is used as the panel unit 11, light of a blue light-emitting diode (LED) passes through a quantum dot film to produce a green or red color. The panel unit 11 is not limited to the self-light-emitting type display element, and may include a liquid crystal display (LCD) or other light-modulating element, and may form an image by illuminating the light-modulating element with a light source such as a backlight. As the panel unit 11, a liquid crystal on silicon (LCOS; trade name), a digital micro-mirror device, and the like may be used instead of the LCD.

Here, from a viewpoint of achieving higher definition and the like, as a display element used for the panel unit 11 of the image display device 10, for example, a case in which a small display element such as a micro display is desirably employed is conceivable. To realize higher definition, a liquid crystal panel that uses hypertext transfer protocol secure (HTPS) or a Si backplane, or an OLED panel, for example, need to be applied. This is because these panels have a proportional relationship between panel size and panel unit price. That is, from a practical viewpoint of reducing a product cost or the like, a smaller panel needs to be applied. However, when an attempt is made to further reduce the size of a panel while widening an angle of view, that is, to apply a smaller panel size, a focal distance of an optical system also needs to be reduced. That is, a curvature radius of a lens needs to be reduced. In this case, in a component of light in a wide visual field angle side, due to a restriction of a total reflection condition in a lens surface, a shape having strong curvature cannot be adopted, and desirable reduction in a panel size may not be achieved. In the HMD 100 of this exemplary embodiment, in consideration of the above, the size of the panel unit 11 is reduced. Note that a length of a side of the panel unit 11 having the size of the panel is preferably less than or equal to 2.5 inches, and furthermore less than or equal to 1 inch (more preferably, about from 12 to 13 mm) from a viewpoint of demand for size reduction. In this exemplary embodiment, a small panel such as a micro display is used as the image display device 10, and an image by this panel is enlarged by the enlargement optical system 20, and thus an image having a wide angle of view can be formed.

The image display device 10, in addition to the above, is provided with the polarization plate 12 and the incident-side polarization conversion member 13. The polarization plate 12 is adhered onto a light-emitting surface of the cover glass CG. The polarization plate 12 is a transmissive polarization plate, and is a member for extracting a linearly polarized light component of the imaging light GL when the imaging light GL from the panel unit 11 passes therethrough. The incident-side polarization conversion member 13 is a quarter wavelength plate, that is, a $\lambda/4$ plate, and converts a polarization state of light passing therethrough. That is, the incident-side polarization conversion member 13 is positioned downstream of a light path of the polarization plate 12, and converts the imaging light GL passing through the polarization plate 12 and being the linearly polarized light to circularly polarized light. Note that the attachment forms of the polarization plate 12, the incident-side polarization conversion member 13, and the like described above are examples, and can be changed as appropriate in a range capable of maintaining the intended polarization state.

Next, the enlargement optical system 20 of the HMD 100 includes a projection lens 21, a cemented lens 22, and a transmission/reflection selection member 23.

The projection lens 21 is a convex lens or a convex meniscus lens (in the example illustrated, the lens is a convex meniscus lens, but may be a convex lens) provided immediately back-stage of the image display device 10, and emits the imaging light GL from the image display device 10 toward optical members disposed downstream on the light path (−Z side). In other words, in the enlargement optical system 20, the projection lens 21 is a front-stage lens disposed at a position closest to the image display device 10 and configured to adjust a light path of the imaging light GL. By introducing the projection lens 21, it is possible to further improve a resolution performance and reduce a panel size of the image display device 10. This makes it possible to suppress a manufacturing cost of the image display unit 10 as well. Further, a telecentric angle of a light beam emitted from the image display unit 10 can be suppressed as well, and thus generation of variations in brightness and chromaticity due to panel visual field angle characteristics can be suppressed. Here, in the example illustrated, the projection lens 21 is constituted by one lens PL (convex meniscus lens). Note that, as described above, the lens PL may be a convex lens.

In particular, in this exemplary embodiment, a coloring correction optical member CC configured to correct a degree of coloring in accordance with a yellowness of a coloring optical member CO described later is employed as the lens PL constituting the projection lens 21. The coloring correction optical member CC is a colored member colored in a complementary color (blue) of the colored optical member CO. The lens PL is configured as the coloring correction optical member CC by mixing an additive in a specific glass material or resin material, or the like. Note that, in FIG. 1, the coloring correction optical member CC and the colored optical member CO are indicated by different patterns of hatching. This is the same for subsequent drawings as well.

The cemented lens 22 is configured by joining two lenses, namely, a concave lens 22a and a convex lens 22b arranged in that order from the image display device 10 side or the +Z side, and a joining portion CN formed by including a half mirror HM is provided between the concave lens 22a and the convex lens 22b.

Next, of the cemented lens 22, first, the convex lens 22a is a planoconcave lens disposed closer to the image display device 10 than the convex lens 22b, includes a concave surface CE on a front-of-eye side (−Z side) of the user, and includes a light incident plane SI being a flat surface as a light incident surface to which the imaging light GL from the image display device 10 is incident on the image display device 10 side being an opposite side to the concave surface CE. A refractive index of the concave lens 22a is less than a refractive index of the convex lens 22b. Further, the concave surface CE includes a spherical surface having a curved surface shape corresponding to a convex surface CV of the convex lens 22b. That is, the concave lens 22a is a spherical surface planoconcave lens.

Next, the convex lens 22b is a planoconvex lens disposed closer to the front of the eye of the user than the concave lens 22a, in an extracting location for extracting the imaging light GL to outside the device, includes a light-emitting surface SE being a flat surface as a light-emitting surface on the front-of-eye side, and includes a convex surface CV on the image display device 10 side being an opposite side to the light-emitting surface SE. The convex lens 22b is a highly refractive lens with a refractive index of 1.8 or greater, for example, so as to obtain an image with a sufficiently wide angle of view. Further, the convex surface CV is a spherical surface. That is, the convex lens 22b is a spherical surface planoconvex lens. Here, as the convex lens 22b, for example, the colored optical member CO having a yellowness of a predetermined value or greater is employed in order to maintain a refractive index of 1.8 or greater. For example, a member having a high refractive index and obtained by mixing an additive into a specific glass material or resin material or the like, thereby satisfying a desired numerical value, can be employed as the convex lens 22b. Note that, here, the convex lens 22b is a high refractive index member having a higher refractive index than those of the other optical members disposed on the light path of the imaging light GL. Further, as the convex lens 22b, it is conceivable to employ a convex lens having a yellowness of 10 or greater, for example, as the colored optical member CO.

The convex lens 22b and the concave lens 22a are bonded at the convex surface CV and the concave surface CE, and form the bonding portion CN. The half mirror HM, being a semi-reflective and semi-transmissive film for transmitting one portion and reflecting the other portion of the imaging light GL, is provided to the joining portion CN. Note that the half mirror HM is constituted by, for example, a dielectric multilayer film, a metal film, or the like, and is provided to the joining portion CN, and thus has a concave curved surface shape when viewed from the user side.

Further, both the light-emitting surface SE and the light incident surface SI are parallel to the light-emitting surface 11a of the image display device 10. In the example illustrated, the light-emitting surface SE and the light incident surface SI are parallel to the XY plane. Note that, as a tolerance of parallelism here, for example, within ±2° is conceivable.

The transmission/reflection selection member 23 is provided to a light-emitting side of the convex lens 22b, includes an emitting-side polarization conversion member 23a, and a semi-transmissive reflection type polarization plate 23b, and selectively performs transmission or reflection according to a polarization state of light.

The emitting-side polarization conversion member 23a of the transmission/reflection selection member 30 is a quarter wavelength plate, that is, a λ/4 plate, and converts a polarization state of light passing therethrough. As illustrated, the emitting-side polarization conversion member 23a is adhered to the light-emitting surface SE of the convex lens 22b, and is provided between the convex lens 22b and the semi-transmissive reflection type polarization plate 23b. The emitting-side polarization conversion member 23a converts a polarization state of a component traveling back and forth between the semi-transmissive reflection type polarization plate 23b and the half mirror HM. Here, the emitting-side polarization conversion member 23a being the quarter wavelength plate converts the imaging light GL being in a state of circular polarization of light to the linearly polarized light, or, conversely, converts the imaging light GL being in a state of linear polarization of light to the circularly polarized light.

The semi-transmissive reflection type polarization plate 23b of the transmission/reflection selection member 30 is adhered to the light-emitting surface SE with the emitting-side polarization conversion member 23a interposed therebetween. That is, the semi-transmissive reflection type polarization plate 23b is a member disposed on a side closest to the position PE of a pupil assumed as a position of the eye EY of the user, and emits the imaging light GL toward the front-of-eye side of the user. Here, the semi-transmissive reflection type polarization plate 23b includes a reflective type wire grid polarization plate. That is, the semi-transmissive reflection type polarization plate 23b changes a transmission/reflection characteristic depending on whether a state of polarization of an incident component is in a polarization transmission axis direction or not. In this case, since the emitting-side polarization conversion member 23a is disposed upstream of a light path of the semi-transmissive reflection type polarization plate 23b, a polarization state of light changes each time the light passes through the emitting-side polarization conversion member 23a, and the semi-transmissive reflection type polarization plate 23b transmits or reflects the incident component according to the change. Here, as an example, the horizontal direction (X direction) assumed as a direction in which the eyes of the observer are aligned is the polarization transmission axis direction. Note that the semi-transmissive reflection type polarization plate 23b including the reflection type wire grid polarization plate changes the transmission/reflection characteristic according to a state of polarization of the incident component, and thus, may also be referred to as a reflection type polarization plate.

The transmission/reflection selection member 23 includes the emitting-side polarization conversion member 23a and the semi-transmissive reflection type polarization plate 23b as described above, and thus can change a polarization state of light and, according to the change, selectively transmit or reflect the light.

A light path of the imaging light GL will be described below briefly with reference to FIG. 1. First, the imaging light GL modulated in the panel unit 11 in the image display device 10 is converted to linearly polarized light in the polarization plate 12 being a transmissive polarization plate. Here, a polarization direction of the linearly polarized light having passed through the polarization plate 12 is a first direction. After the imaging light GL is converted to linearly polarized light in a first direction by the polarization plate 12, the imaging light GL is converted to circularly polarized light by the incident-side polarization conversion member 13 being a first quarter wavelength plate, and is emitted toward the enlargement optical system 20 through a light-guiding portion GL.

The imaging light GL emitted is incident on the concave lens 22a from the light incident surface SI positioned closest to the image display device 10 side of the enlargement optical system 20. Subsequently, the imaging light GL reaches the joining portion CN provided with an interface, that is, the half mirror HM, between the concave lens 22a and the convex lens 22b. Some components of the imaging light GL pass through the half mirror HM, and are converted to linearly polarized light by the emitting-side polarization conversion member 23a being a second quarter wavelength plate. Here, after the linearly polarized light passes through the polarization plate 12, the linearly polarized light passes through the quarter wavelength plate twice, and thus the polarization direction of the linearly polarized light is a different direction by 90° with respect to the first direction. Here, this direction is referred to as a second direction. After the imaging light GL is converted to the linearly polarized light in the second direction by the emitting-side polarization conversion member 23a, the imaging light GL reaches the semi-transmissive reflection type polarization plate 23b (reflection type polarization plate).

Here, the semi-transmissive reflection type polarization plate 23b is set to transmit linearly polarized light in the first direction, and reflect linearly polarized light in the second direction. From another perspective, a transmission characteristic of the polarization plate 12 or a transmission/reflection selection characteristic of the semi-transmissive reflection type polarization plate 23b is thus configured. In this case, the imaging light GL being the linearly polarized light in the second direction is reflected by the semi-transmissive reflection type polarization plate 23b, and again becomes circularly polarized light in the emitting-side polarization conversion member 23a being a quarter wavelength plate, and reaches the half mirror HM. At the half mirror HM, some components of the imaging light GL pass through as they are, but remaining components are reflected, and the components of the imaging light GL thus reflected are this time converted to the linearly polarized light in the first direction by the emitting-side polarization conversion member 23a being a quarter wavelength plate. The components of the imaging light GL converted to the linearly polarized light in the first direction pass through the semi-transmissive reflection type polarization plate 23b, and the imaging light GL reaches the position PE of the pupil assumed as a location in which the eye EY of the user exists.

Note that, from the configuration described above, the imaging light GL follows a light path that is folded back inside the enlargement optical system 20 and, for example, a component GLc being the imaging light GL on a center side that passes through the vicinity of the optical axis AX also follows a folded light path as indicated by the dashed arrow AR1 in the drawing. In this case, a component GLc has a longer light path length passing through the convex lens 22b than a component GLp, which is the imaging light GL on a peripheral side.

As described above, in the enlargement optical system 20, the HMD 100 of this exemplary embodiment constitutes a turning optical system in which the light path of the imaging light GL is folded by the joining portion CN provided with the half mirror HM and the transmission/reflection selection member 23. In other words, the turning optical system includes the convex lens 22b including the convex surface CV on the image display device 10 side, the concave lens 22a disposed closer to the image display device 10 than the convex lens 22b and including the concave surface CE that joins with the convex surface CV of the convex lens 22b, and the half mirror HM provided to the joining portion CN between the convex surface CV and the concave surface CE, and the convex lens 22b is the colored optical member CO.

By utilizing the reflection of the half mirror HM provided to the curved surface of the turning optical system or the like, the imaging light GL can be light having a wide angle of view. Further, in this case, the concave lens 22a is the coloring correction optical member CC, and the coloring applied by the convex lens 22b is corrected by the concave lens 22a.

Here, in the case of the configuration described above, the light incident surface SI and the light-emitting surface SE of the two lenses 22a, 22b are flat surfaces. Thus, a location of a curved surface portion where the two lenses 22a, 22b are joined is responsible for light path adjustment of each bundle of rays constituting the imaging light GL for widening the angle of view. That is, a reflection action at the half mirror HM formed in this surface, and a refraction action due to a difference in refractive index between the two lenses 22a, 22b adjust the light path. Therefore, the enlargement optical system 20 having such a configuration as described above can be formed by using materials having different refractive indexes and different Abbe numbers for the two lenses 22a, 22b. From such conditions, in particular, the convex lens 22b is a high refractive index member having a refractive index of 1.8 or greater. However, conceivably it is impossible or very difficult from the perspectives of cost and the like to prepare a material that satisfies the conditions described above, that is, a colorless transparent resin material or glass material that satisfies the condition of the Abbe number in addition to the refractive index and further satisfies a certain level of optical transparency or greater, and the like. Therefore, in this exemplary embodiment, the material used as the high refractive index member is permitted to have a yellowness of a predetermined value or greater and, in accordance with this yellowness, a correction optical member configured to correct this is employed in another optical member, thereby establishing a configuration in which the entire optical system is capable of maintaining a white balance of the image as a whole. More specifically, in this exemplary embodiment, as described above, the colored optical member CO having a yellowness of 10 or greater is employed as the convex lens 22b and, in accordance with the yellowness of the colored optical member CO, the coloring correction optical member CC that corrects this is employed as the lens PL constituting the projection lens 21, thereby maintaining the white balance of the entire optical system constituting the HMD 100. From a different perspective, with the configuration described above, the white balance of the image as a whole can be maintained in an optical system other than the panel unit 11 and thus, even when a material having a high yellowness is utilized in the optical system, an image in which the white balance is maintained can be displayed without performing special image processing for correcting this on the side of the panel unit 11, that is, on the display element side.

Note that the yellowness in terms of the degree to which the hue deviates from colorless or white in the yellow direction is defined by the following formula, given YI as the yellowness in an XYZ color system, for example.

$$YI=100(1.2985X-1.1335Z)/Y$$

Accordingly, the yellowness of 10 or greater described above refers to a yellowness YI of a value of +10 or greater in terms of the above formula, using a yellowness Y1 of zero (colorless state) as a reference.

As described above, the head-mounted display (HMD) according to this exemplary embodiment includes the image display device 10 including the panel unit 11 serving as the display element configured to display an image, the colored optical member CO disposed on the light path of the imaging light GL emitted from the panel unit 11 and having a yellowness of a predetermined value or greater, and a coloring correction optical member CC configured to correct a degree of coloring of the imaging light GL of the entire light path in accordance with the yellowness of the colored optical member CO.

In the HMD 100 described above, the colored optical member CO disposed on the light path of the imaging light GL and having a yellowness (for example, yellowness YI of +10 or greater) is employed as the optical member, making it possible to employ a member having a high refractive index. That is, the size and weight of the device can be reduced, and a wide angle of view of the image can be achieved. On the other hand, the coloring correction optical member CC is provided, thereby avoiding or suppressing deterioration of the image caused by the colored optical member CO (the image being tinged yellow), and maintaining the white balance of the image as a whole. Further, in this case, the burden of image processing can be reduced compared to a method in which image quality is maintained by image processing using the panel unit 11 constituting the display element or the like, for example.

The widening or the angle of view and the visibility of the HMD 100 are discussed below. Generally, in a virtual image display device such as an HMD, it is assumed that the device is mounted on a human head, and the angle of view is widened while maintaining a small size. Thus, the optical system has a very short focal length. For example, it is assumed that a field of view (FOV) or angle of view of the HMD 100 described above and illustrated in this exemplary embodiment has a half angle θ of 50°, that is, a full angle of view of 100°, for example. To satisfy this, for example, it is conceivable to establish a configuration in which a total length of the enlargement optical system 20 is about 14 mm, a length of an eye relief is about 10 mm, and a diameter of an eye ring is about 6 mm. Further, a radius of curvature of the lens surfaces, that is, the convex surface CV of the convex lens 22b and the concave surface CE of the concave lens 22a, is about 44 mm. On the other hand, for visibility, a color determination range of the human eye is about ±20° and a rotation range of the eyeball is about ±20°, and thus the correction of the coloring described above is preferably suitably performed on, in particular, the imaging light GL of a range of a full angle of view FOV of ±40°, that is, in terms of the half angle of view illustrated in the drawing, a range from a center side (angle 0°) to angle $\theta_1$=40°. Therefore, in this exemplary embodiment, the lens PL, being the coloring correction optical member CC, is constituted by a convex meniscus lens or a convex lens in accordance with the colored optical member CO being the convex lens 22b. In this case, the colored optical member CO is a lens having a thick center side near the optical axis AX and a thin peripheral side away from the optical axis AX. Furthermore, the colored optical member CO is a turning portion of the turning optical system. Thus, in terms of the light path length of the imaging light GL as well, the range in which the component GLc on the center side passes through the convex lens 22b is long compared to that of the component GLp on the peripheral side, as described above. Accordingly, it is conceivable that the degree of yellowness caused by the colored optical member CO is large as well. In response to this, in this exemplary embodiment, the coloring correction optical member CC is constituted by a convex meniscus lens or a convex lens, and the light path length of the component GLc in the coloring correction optical member CC is longer than the light path length of the component GLp. That is, the light path length of the imaging light GL passing through the coloring correction optical member CC is determined in correspondence with the light path length of the imaging light GL passing through the colored optical member CO. As a result, for example, by correcting the degree of coloring in the required angle of view range, such as a range of the full angle of view FOV of ±40°, that is, a range of at least the angle of view of 40° or less, it is possible to maintain a white balance in a range of high visibility of the display screen.

Figure 2:
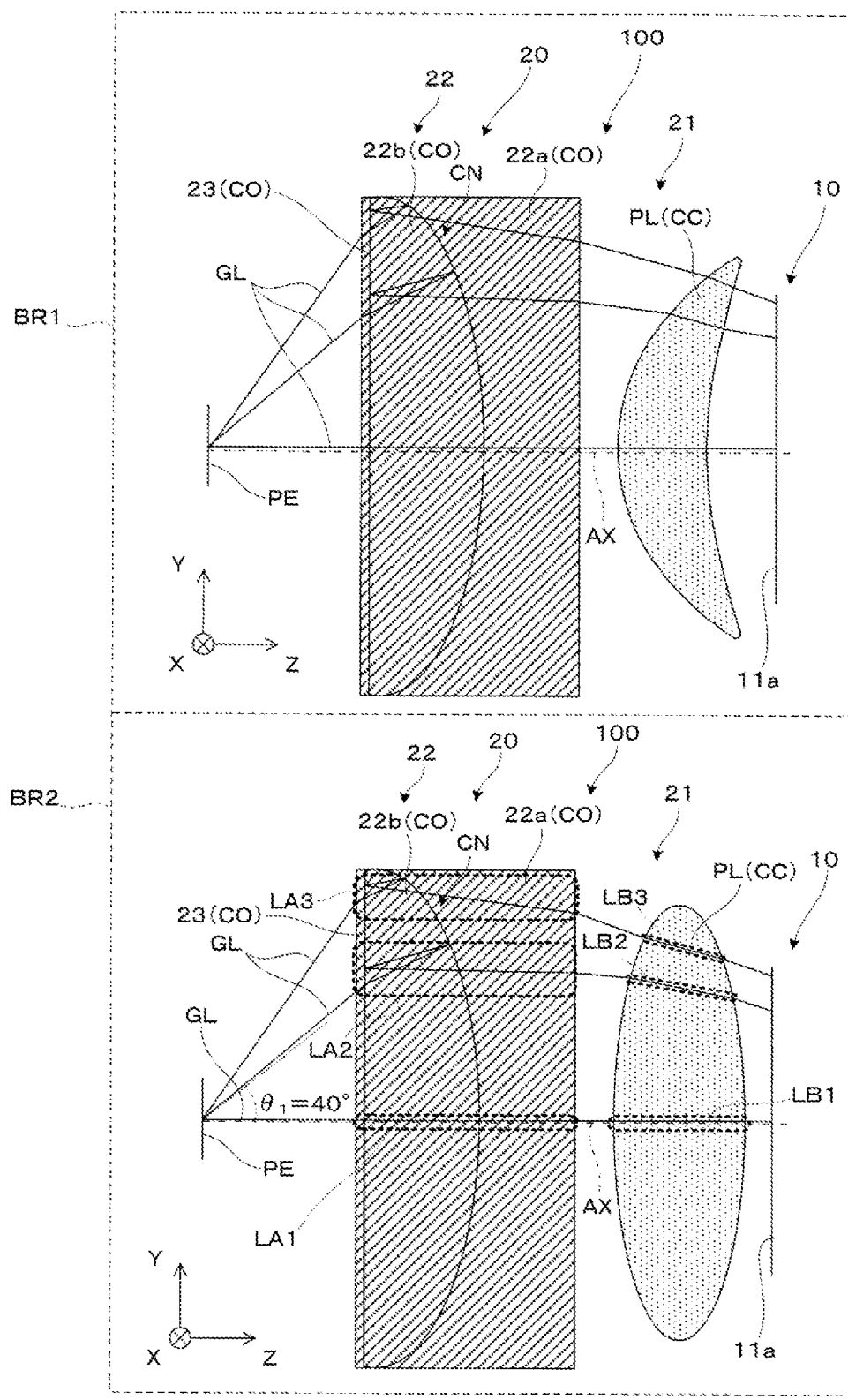
FIG. 2 is a side cross-sectional view for conceptually describing an HMD of a modification.

A modification of this exemplary embodiment will be described below with reference to FIG. 2. FIG. 2 is a side cross-sectional view for conceptually describing the HMD 100 of a modification of this exemplary embodiment, and is a view corresponding to FIG. 1. However, as illustrated by a difference in hatching, in the example illustrated in a first region BR1 in FIG. 2, for example, the configuration is similar to that of FIG. 1 except for locations where the colored optical member CO and the coloring correction optical member CC are employed, and thus only the main portion of the optical system is illustrated, and drawings and descriptions of the other portions are omitted.

In the example of the first region BR1 in FIG. 2, a high refractive index member having a refractive index higher that of the coloring correction optical member CC, that is, the other optical members, is employed in part or in whole for not only the convex lens 22b, but also the concave lens 22a and the transmission/reflection selection member 23 of the enlargement optical system 20. On the other hand, similar to the case of FIG. 1, the lens PL is the coloring correction optical member CC. Further, while in the example illustrated in the first region BR1, the lens PL constituting the projection lens 21 is a convex meniscus lens, the lens PL may be a convex lens, as illustrated in a second region BR2 and described above.

The relationship between the light path length of the imaging light GL and the thickness of the lens will be described more specifically below utilizing the example illustrated in the second region BR2, that is, an example of a case in which the coloring correction optical member CC is a convex lens. As illustrated, here, as an example, the relationship between light path lengths (hereinafter, light path lengths L1, L2, L3) of the imaging light GL passing through regions LA1, LA2, LA3 of the cemented lens 22 and the transmission/reflection selection member 23 constituting the colored optical member CO, and light path lengths (hereinafter, light path lengths LC1, LC2, LC3) of regions LB1, LB2, LB3 of the lens PL, constituting the coloring correction optical member CC, corresponding thereto will be discussed.

As described above, for the colored optical member CO, the light path lengths L1, L2, L3 have a relationship such that L1>L2>L3. That is, the light path length L1 of the region LA1, which is on the center side, is the longest, and the coloring of the imaging light GL upon passing through the coloring correction optical member CC is considered the strongest. Accordingly, for the coloring correction optical member CC, the light path lengths LC1, LC2, and LC3 also have a relationship such that LC1>LC2>LC3. That is, for example, the light path length LC1 in the region LB1 through which passes the imaging light GL that passed through the region LA1, which is considered to have the strongest coloring, is the longest, thereby resulting in the strongest degree of correction. Here, of the above, in consideration of the above-mentioned angle $\theta_1$=40° for the half angle of view, it is more desirable that the correction amount is balanced in the range from the center side to the peripheral side (the range related to the Y direction) indicated by the optical axis AX, particularly from the region LA1 to the region LA2, and the corresponding range from the region LB1 to the region LB2.

With regard to the above, for example, a form is conceivable in which the light path lengths L1, L2 of the imaging light GL when passing through the colored optical member CO and the light path lengths LC1, LC2 when passing through the coloring correction optical member CC correspond to each other, and a ratio of color change per unit light path length of the colored optical member CO and a ratio of color change per unit light path length of the coloring correction optical member CC are equal. Alternatively, a form is conceivable in which the light path lengths L1, L2 when passing through the colored optical member CO are a constant multiple of the light path lengths LC1, LC2 when passing through the coloring correction optical member CC, and the ratio of color change per unit light path length of the colored optical member CO is the reciprocal of the ratio of color change per unit light path length of the coloring correction optical member CC. With a configuration such as described above, the degree of coloring of the coloring correction optical member is defined in accordance with the yellowness of the colored optical member and the light path length of the imaging light GL passing through the coloring correction optical member and the colored optical member, making it possible to form an image having more favorable coloring.

Second Exemplary Embodiment

An example of an HMD according to a second exemplary embodiment will be described below with reference to FIG. 3.

The HMD according to this exemplary embodiment is a modification of the HMD illustrated in the first exemplary embodiment, and is similar to the case in the first exemplary embodiment except for the configuration of the projection lens. Thus, description related to the HMD as a whole will be omitted, and only a structure related to the optical system will be described.

Figure 3:
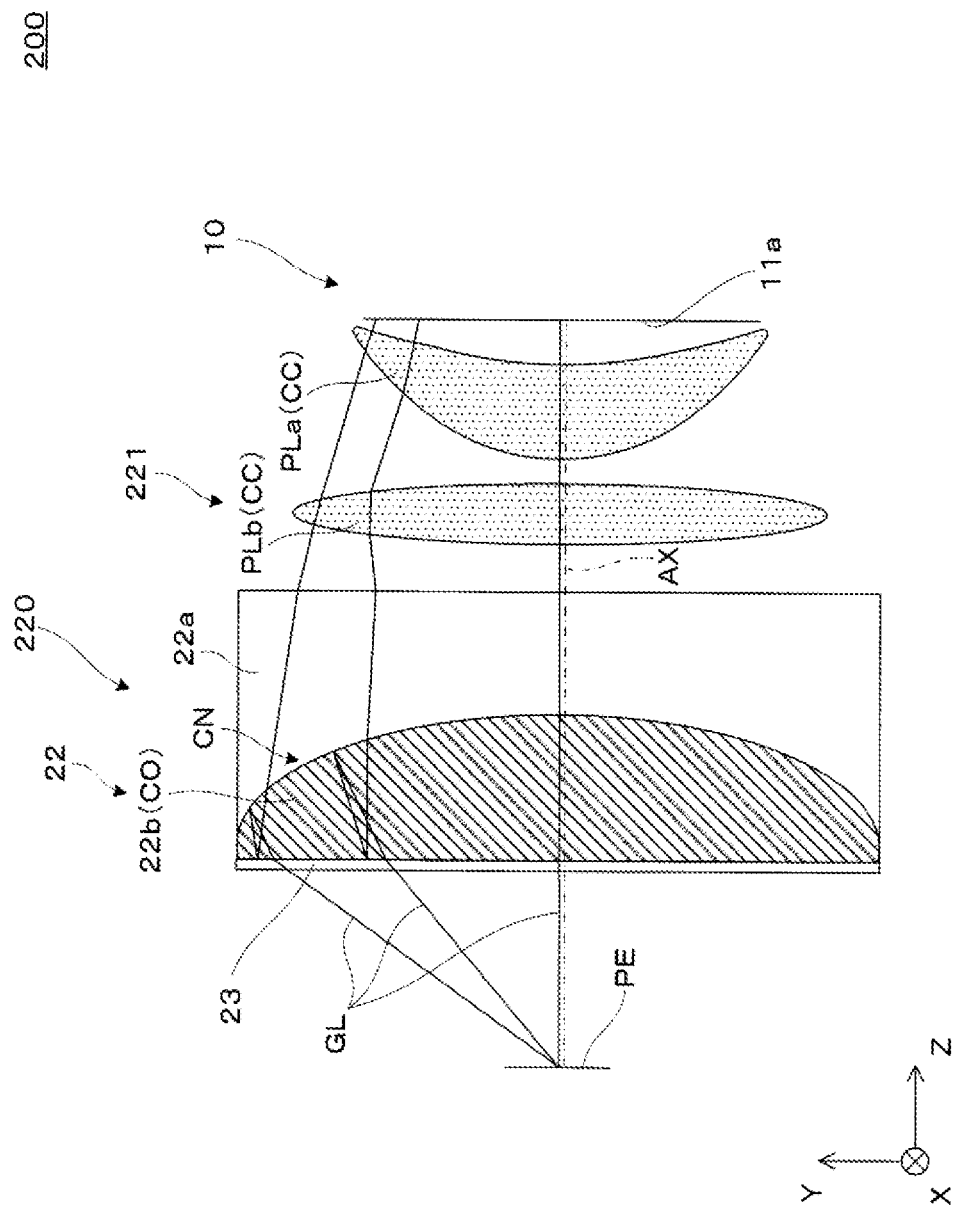
FIG. 3 is a side cross-sectional view for conceptually describing an HMD according to a second exemplary embodiment.

FIG. 3 is a side cross-sectional view for conceptually describing an HMD 200 according to this exemplary embodiment, is a view corresponding to FIG. 1 and the like, and is a view illustrating only a main portion of an optical system.

The HMD 200 of this exemplary embodiment differs from that in the first exemplary embodiment in that, as illustrated, a projection lens 221 of an enlargement optical system 220 is constituted by two lenses PLa, PLb. In this exemplary embodiment, both of the lenses PLa, PLb constituting the projection lens 221 constitute the coloring correction optical member CC. Note that, in the example illustrated, the lens PLa is a convex lens, and the lens PLb is a convex meniscus lens. That is, the two lenses PLa, PLb perform coloring correction with respect to the concave lens 22a serving as the colored optical member CO. In yet other words, in this exemplary embodiment, two or more of the three or more lenses constituting the optical system of the enlargement optical system 220 (the two lenses PLa, PLb in the illustrated example) constitute the coloring correction optical member CC.

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, the plurality of the lenses PLa, PLb are configured as the coloring correction optical member CC in the HMD 200, making it possible to achieve more precise correction by adjustment of the light path length and the like, for example. Further, a degree of freedom of a base material and a degree of coloration of the lenses PLa and PLb also increases.

Third Exemplary Embodiment

An example of an HMD according to a third exemplary embodiment will be described below with reference to FIG. 4.

The HMD according to this exemplary embodiment is a modification of the HMD illustrated in the first exemplary embodiment and the like, and is similar to the case in the first exemplary embodiment and the like except for the projection lens not being included and the disposition of the coloring correction optical member. Thus, description related to the HMD as a whole will be omitted, and only a structure related to the optical system will be described.

Figure 4:
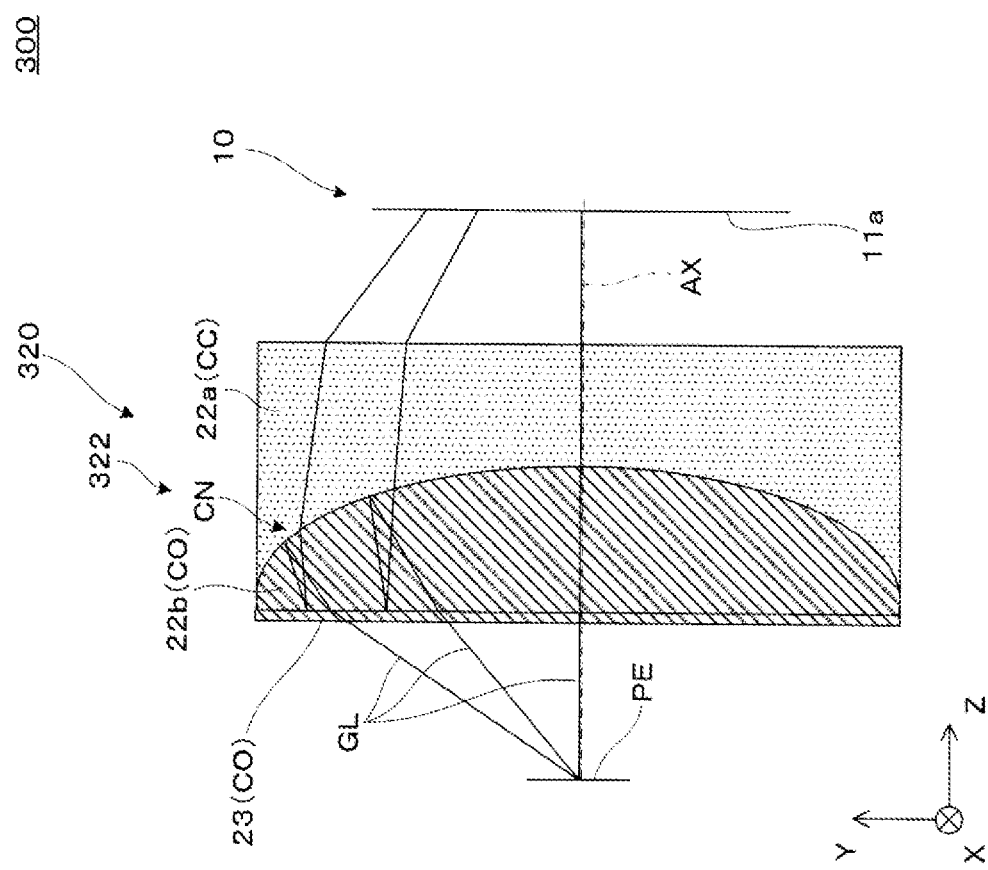
FIG. 4 is a side cross-sectional view for conceptually describing an HMD according to a third exemplary embodiment.

FIG. 4 is a side cross-sectional view for conceptually describing an HMD 300 according to this exemplary embodiment, is a view corresponding to FIG. 1 and the like, and is a view illustrating only a main portion of an optical system.

In the HMD 300 of this exemplary embodiment, as illustrated, an enlargement optical system 320 is constituted by a cemented lens 322 and the transmission/reflection selection member 23, and differs from the case of the first exemplary embodiment and the like in that the configuration does not include a projection lens, and the concave lens 22a of the cemented lens 22 is the coloring correction optical member CC. In this exemplary embodiment, the configuration does not include a projection lens, and thus the size of the optical system is reduced, making it possible to reduce the size of the device in its entirety. Note that, in the illustrated example, the convex lens 22b of the cemented lens 322 as well as the transmission/reflection selection member 23 are used as the colored optical member CO. However, the present disclosure is not limited thereto, and only the convex lens 22b, for example, may be used as the colored optical member CO.

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, in the HMD 300, the enlargement optical system 320 can be reduced in size.

Fourth Exemplary Embodiment

An example of an HMD according to a fourth exemplary embodiment will be described below with reference to FIG. 5 and the like.

The HMD according to this exemplary embodiment is a modification of the HMD illustrated in the first exemplary embodiment and the like, and is similar to the case in the first exemplary embodiment and the like except for the configuration of the image display device and the like. Thus, description related to the HMD as a whole will be omitted, and only a structure related to the optical system will be described.

Figure 5:
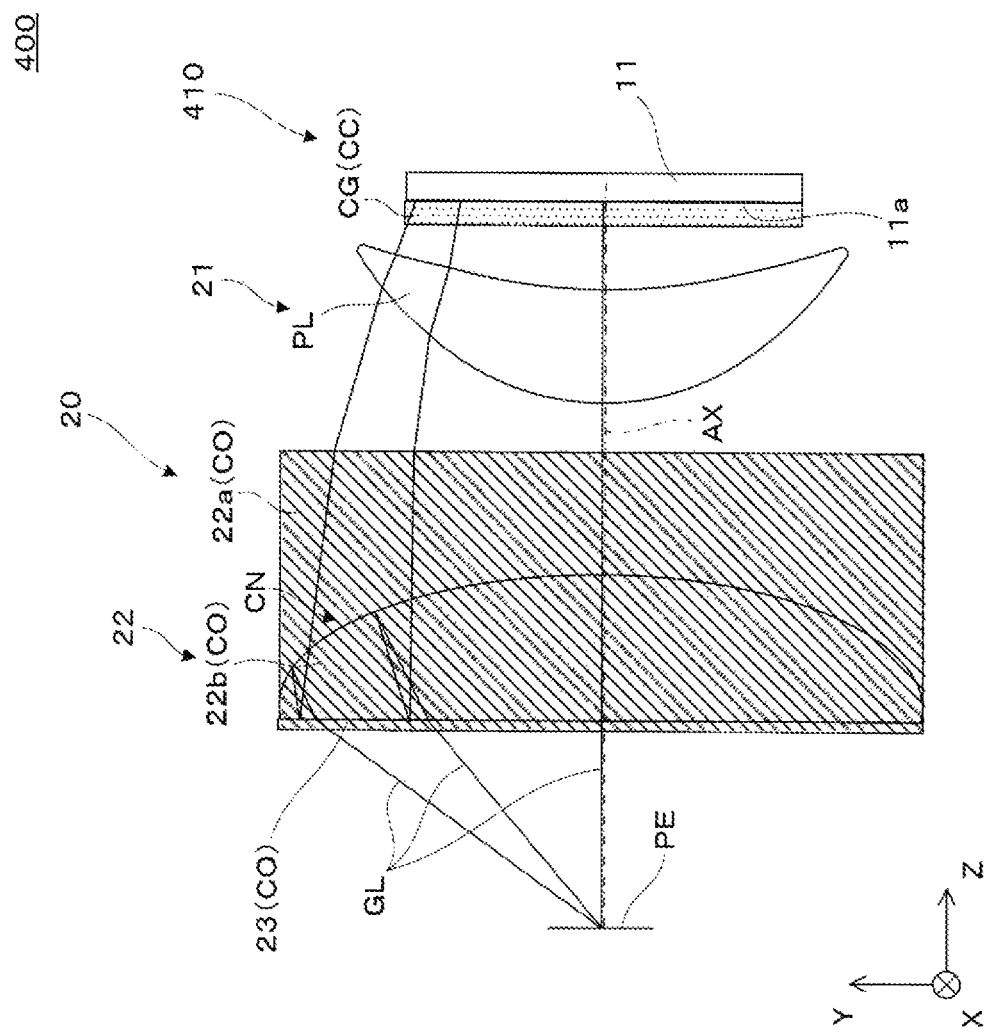
FIG. 5 is a side cross-sectional view for conceptually describing an HMD according to a fourth exemplary embodiment.

FIG. 5 is a side cross-sectional view for conceptually describing an HMD 400 according to this exemplary embodiment, is a view corresponding to FIG. 1 and the like, and is a view illustrating only a main portion of an optical system.

In the HMD 400 of this exemplary embodiment, as illustrated, the HMD 400 differs from that in the first exemplary embodiment and the like in that the cover glass CG is the coloring correction optical member CC in an image display device 410. In this exemplary embodiment, the cover glass CG is the coloring correction optical member CC, making it possible to reduce the size of the coloring correction optical member CC. Further, in this case, as in the modification illustrated in FIG. 6, for example, a thickness of the cover glass CG in the direction along the optical axis AX (Z direction) may be changed according to position (separation with respect to the optical axis AX), and thus the difference in light path length when the imaging light GL passes through the colored optical member CO may be further accommodated.

Note that various forms are conceivable for the location in which the colored optical member CO is employed and, as illustrated in FIG. 5, for example, the coloring correction optical member CC may be employed not only as the convex lens 22b, but also as the concave lens 22a and the transmission/reflection selection member 23 of the enlargement optical system 20, similar to the example illustrated in FIG. 2. Further, in this case, as illustrated, a regular lens having optical transparency and not involved in coloring or correction thereof may be employed as the one lens PL constituting the projection lens 221.

Figure 6:
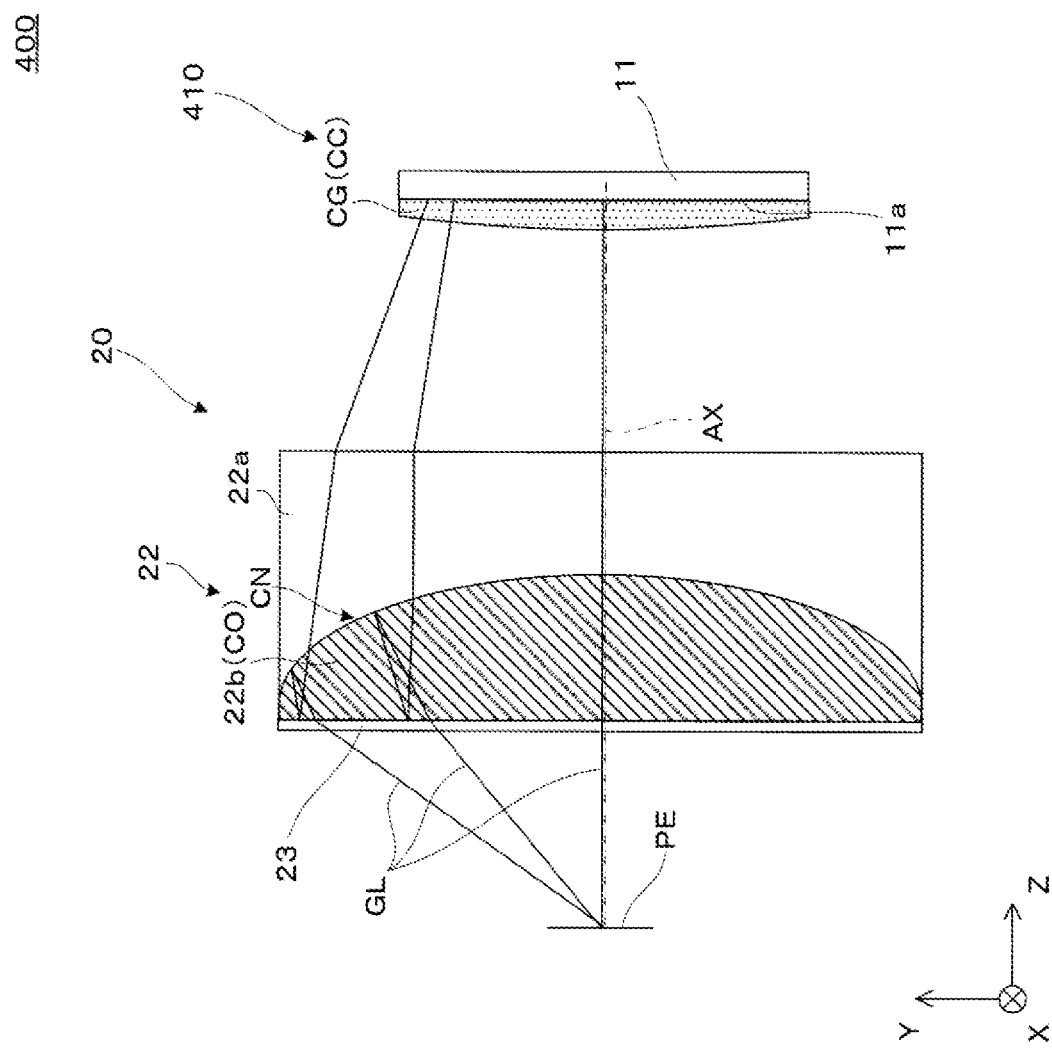
FIG. 6 is a side cross-sectional view for conceptually describing an HMD of a first modification.

Further, as illustrated in FIG. 6, similar to the example illustrated in FIG. 4, a projection lens may not be included in the enlargement optical system 20, and only the convex lens 22b of the enlargement optical system 20 may serve as the colored optical member CO. Note that, in this case, it is conceivable that the thickness of the cover glass CG is varied in accordance with the thickness of the convex lens 22b.

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, the coloring correction optical member CC can be reduced in size, and for example, a cost reduction can be achieved.

Fifth Exemplary Embodiment

An example of an HMD according to a fifth exemplary embodiment will be described below with reference to FIG. 7 and the like.

The HMD according to this exemplary embodiment is a modification of the HMD illustrated in the first exemplary embodiment and the like (in particular, the HMD 300 illustrated in the third exemplary embodiment and the like), and is similar to the case in the first exemplary embodiment and the like except for the configuration of the image display device and the like. Thus, description related to the HMD as a whole will be omitted, and only a structure related to the optical system will be described.

Figure 7:
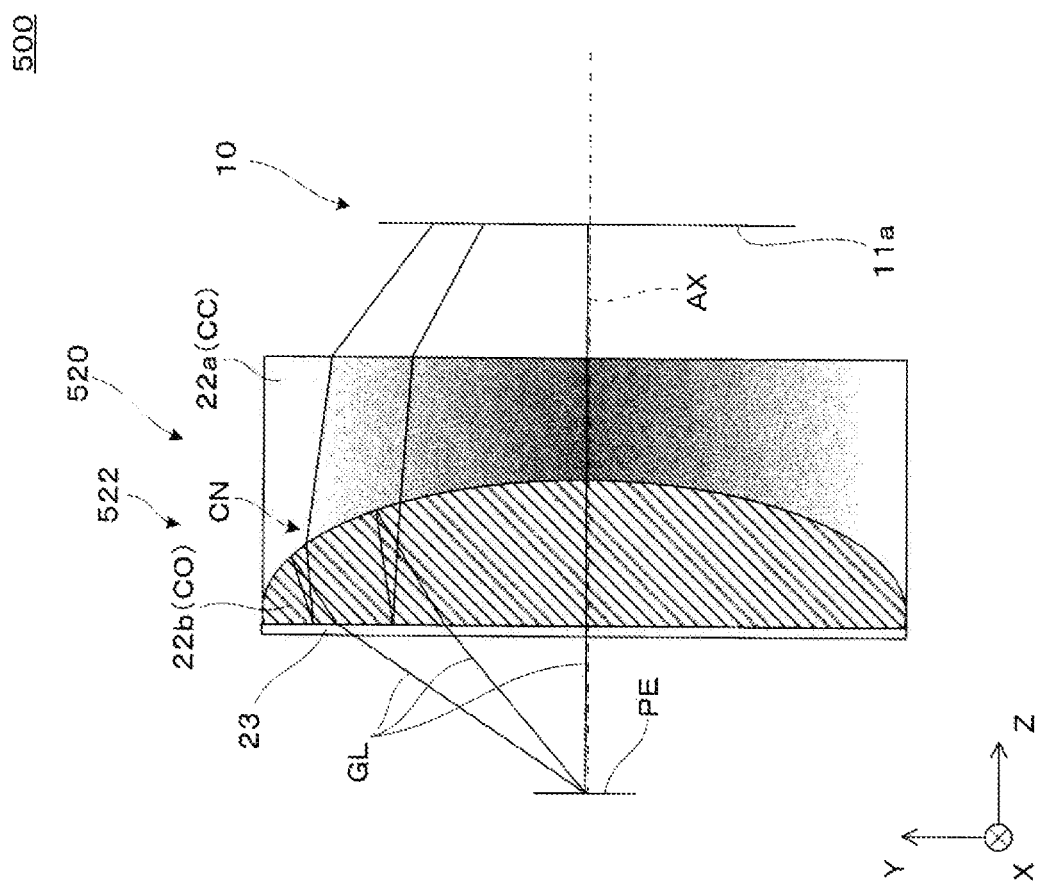
FIG. 7 is a side cross-sectional view for conceptually describing an HMD according to a fifth exemplary embodiment.

FIG. 7 is a side cross-sectional view for conceptually describing an HMD 500 according to this exemplary embodiment, is a view corresponding to FIG. 1 and the like, and is a view illustrating only a main portion of an optical system.

In the HMD 500 of this exemplary embodiment, as illustrated, an enlargement optical system 520 is constituted by a cemented lens 522 and the transmission/reflection selection member 23 and, while common to the HMD 300 illustrated in the example in FIG. 4 in that the configuration does not include a projection lens, differs from the cases of the other exemplary embodiments in that the degree of coloring is varied in the coloring correction optical member CC constituting the concave lens 22a, at a center portion close to the optical axis AX and at an end portion away from the optical axis AX. That is, in this exemplary embodiment, in the coloring correction optical member CC, the degree of coloring of the coloring correction optical member CC differs depending on the light path of the imaging light GL. As a result, in this exemplary embodiment, the degree of correction can be adjusted depending on the light path in accordance with the degree of coloring of the colored optical member CO. Note that, in the illustrated example, the degree of coloring is gradually reduced from the center portion close to the optical axis AX to the end portion away from the optical axis AX, and a degree of change thereof is in accordance with the relationship between the light path length when passing through the colored optical member CO and the light path length when passing through the coloring correction optical member CC.

Figure 8:
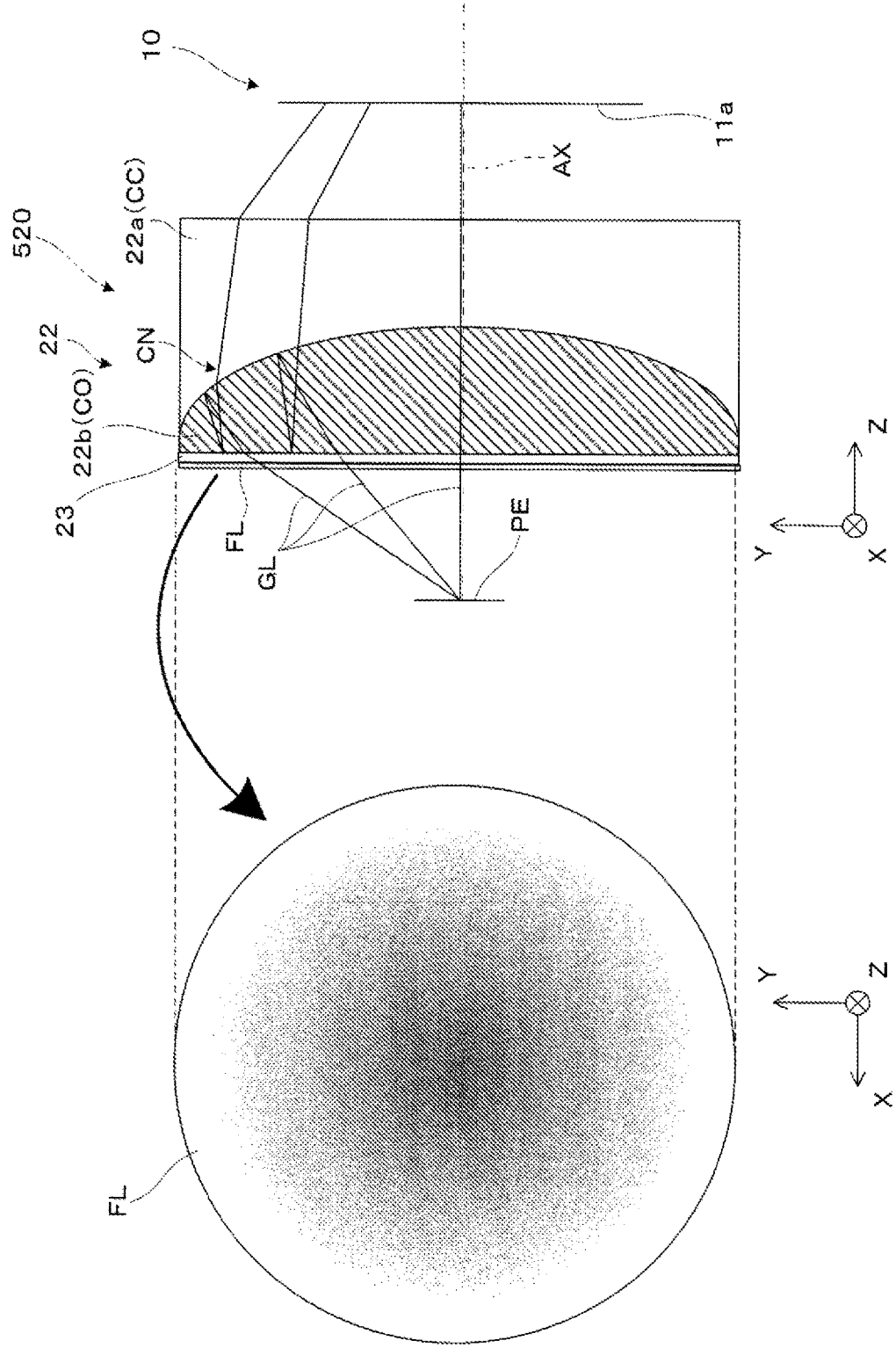
FIG. 8 is a drawing for conceptually describing an HMD of a modification.

Further, as illustrated in the modification illustrated in FIG. 8, the configuration may be such that a film FL having a degree of coloration that changes at a center portion and an end portion is applied to the light-emitting side, that is, the front-of-eye side (−Z side), of the transmission/reflection selection member 23, for example, thereby achieving the same effect as in the case in FIG. 7.

Note that while the example described above illustrates a configuration in which the enlargement optical system 520 does not include a projection lens, the above-described form is conceivable with a configuration including a projection lens as well.

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, in the coloring correction optical member CC, the degree of correction can be adjusted in accordance with the light path.

Sixth Exemplary Embodiment

An example of an HMD according to a sixth exemplary embodiment will be described below with reference to FIG. 9.

The HMD according to this exemplary embodiment is a modification of the HMD illustrated in the first exemplary embodiment and the like (in particular, the example illustrated in FIG. 2), and is similar to the case in the first exemplary embodiment and the like except for the disposition of the colored optical member and the coloring correction optical member. Thus, description related to the HMD as a whole will be omitted, and only a structure related to the optical system will be described.

Figure 9:
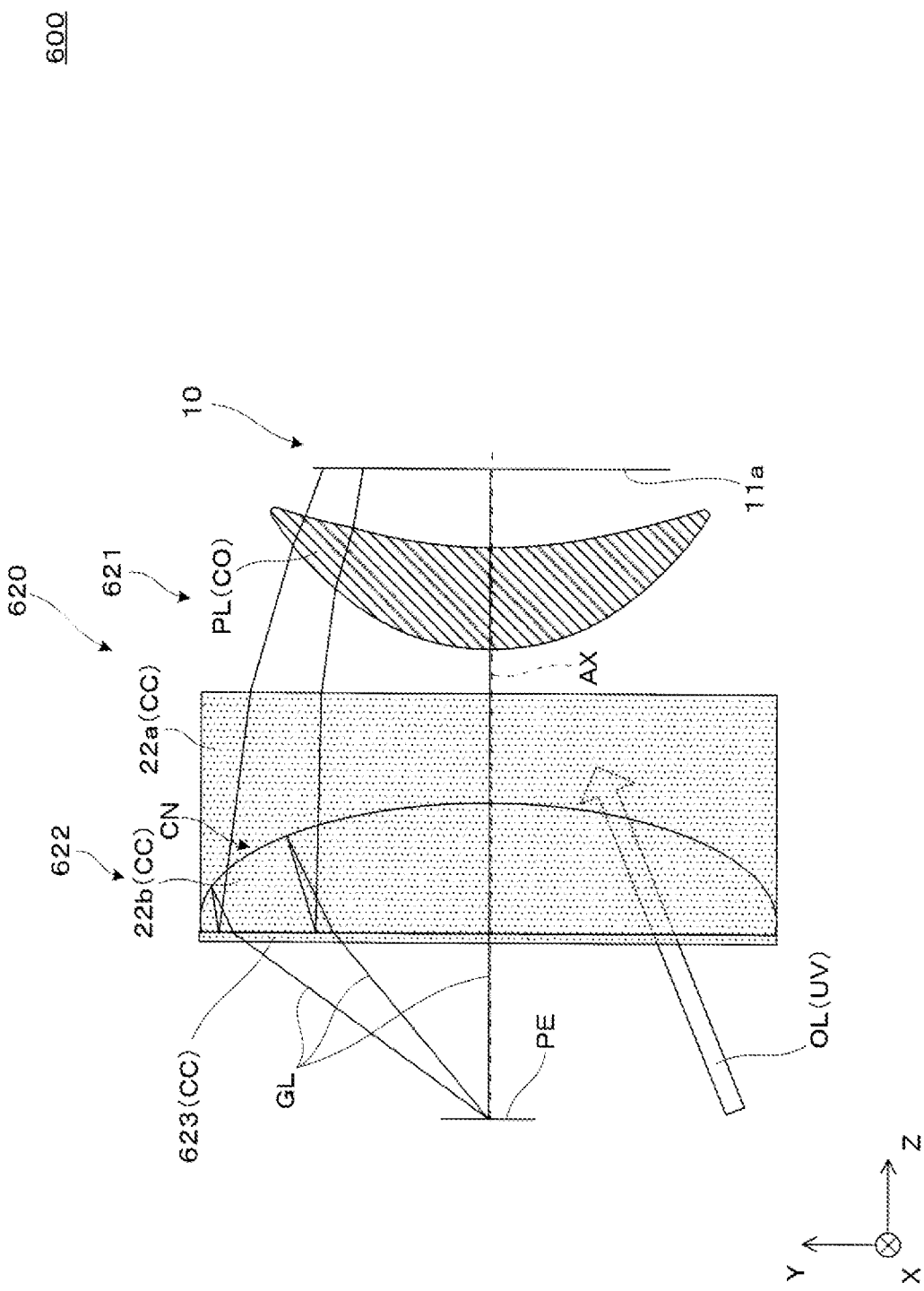
FIG. 9 is a side cross-sectional view for conceptually describing an HMD according to a sixth exemplary embodiment.

FIG. 9 is a side cross-sectional view for conceptually describing an HMD 600 according to this exemplary embodiment, is a view corresponding to FIG. 1 and the like, and is a view illustrating only a main portion of an optical system.

The HMD 600 of this exemplary embodiment differs from that in the case of the first exemplary embodiment and the like in that the colored optical member CO and the coloring correction optical member CC are switched in comparison to the HMD 100 illustrated as an example in FIG. 2. That is, in this exemplary embodiment, the coloring correction optical member CC is employed as, in part or in whole, a cemented lens 622 and a transmission/reflection selection member 623 of an enlargement optical system 620, while the colored optical member CO is employed as a projection lens 621, more precisely, the lens PL constituting the projection lens 621. In this case, as illustrated, it is possible to keep the colored optical member CO away from outside light OL, reduce an exposure amount of ultraviolet light UV contained in the outside light OL, and suppress a yellowing of the colored optical member CO, that is, an increase in the yellowness. Note that, for this reason, the cemented lens 622 and the transmission/reflection selection member 623 constituting the coloring correction optical member CC may have, for example, an ultraviolet light removal action (ultraviolet light reflection effect or absorption effect).

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, the yellowing of the colored optical member CO can be suppressed.

Seventh Exemplary Embodiment

An example of an HMD according to a seventh exemplary embodiment will be described below with reference to FIG. 10.

The HMD according to this exemplary embodiment is a modification of the D in the first exemplary embodiment and the like, and is similar to the case in the first exemplary embodiment and the like except for the lens configuration. Thus, description related to the HMD as a whole will be omitted, and only a structure related to the optical system will be described.

The HMD 700 according to this exemplary embodiment includes, as an enlargement optical system 720, a lens 724 as a light-emitting side lens in addition to a projection lens 721, a cementing lens 722, and a transmission/reflection selection member 723.

As illustrated, in the cemented lens 722, a lens 722b is a planoconvex lens including a flat surface on the light-emitting side, similar to the convex lens 22b and the like of FIG. 1, but the lens 722b includes the concave surface CE on the front-of-eye side (−Z side) of the user, that is, the light-emitting side, and the light incident surface SI provided on the light incident side (+Z side) is also a curved surface. In the example illustrated, the light incident surface SI is a convex surface. Furthermore, the enlargement optical system 720 includes a lens 724 that is a planoconvex lens on the light-emitting side of the transmission/reflection selection member 723 as a light-emitting side lens. That is, in the lens 724, a flat surface on the light incident side (+Z side) is applied to the transmission/reflection selection member 723, and the convex surface on the light-emitting side (−Z side) forms the light-emitting surface SE.

Note that, in the above case, the cemented lens 722, the transmission/reflection selection member 723, and the lens 724 may be captured as a single cemented lens PG.

While, for the projection lens 721, one convex lens is used as the lens PL in the example illustrated, the present disclosure is not limited thereto, and various forms can be used.

Figure 10:
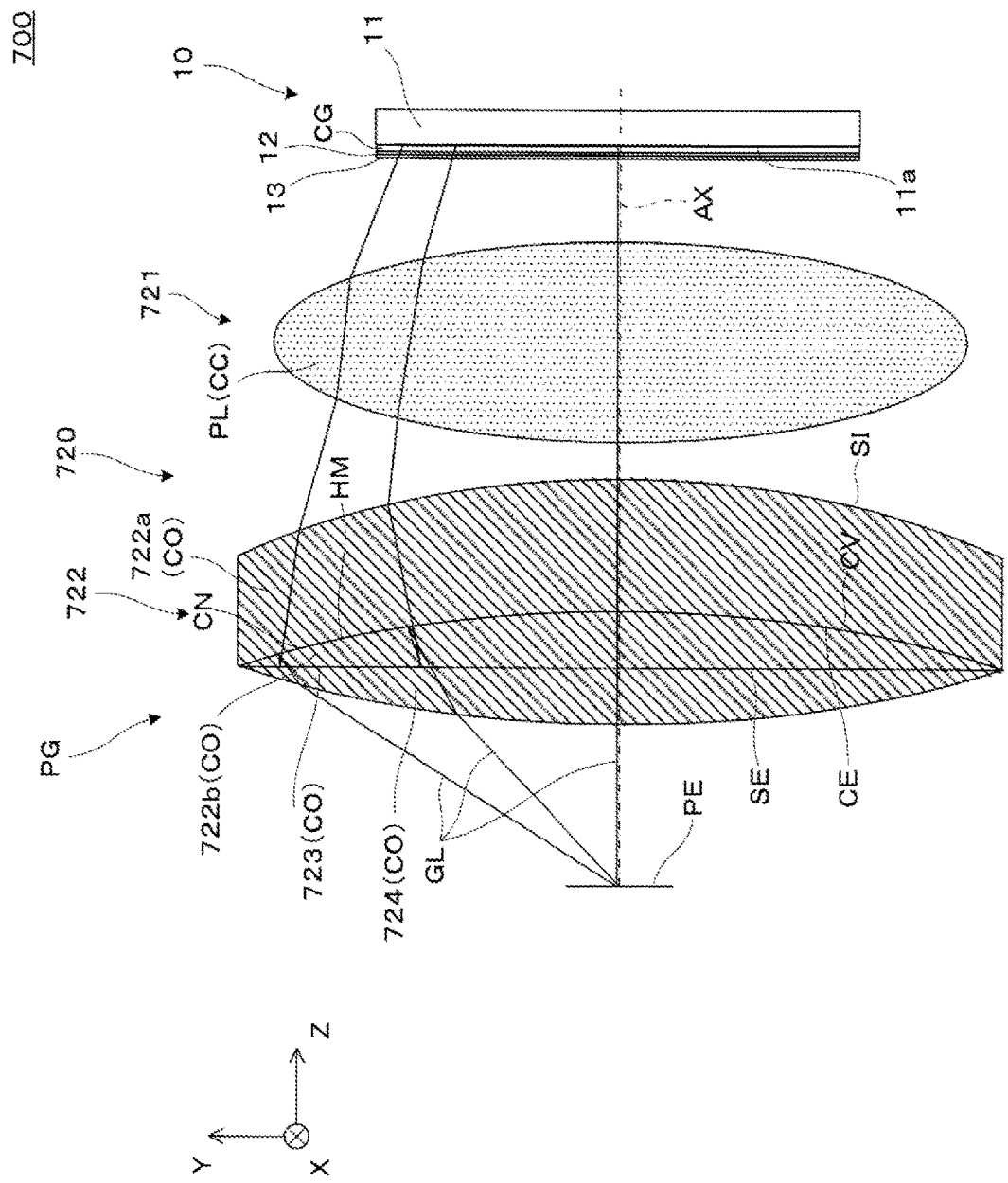
FIG. 10 is a side cross-sectional view for conceptually describing an HMD according to a seventh exemplary embodiment.
Figure 11:
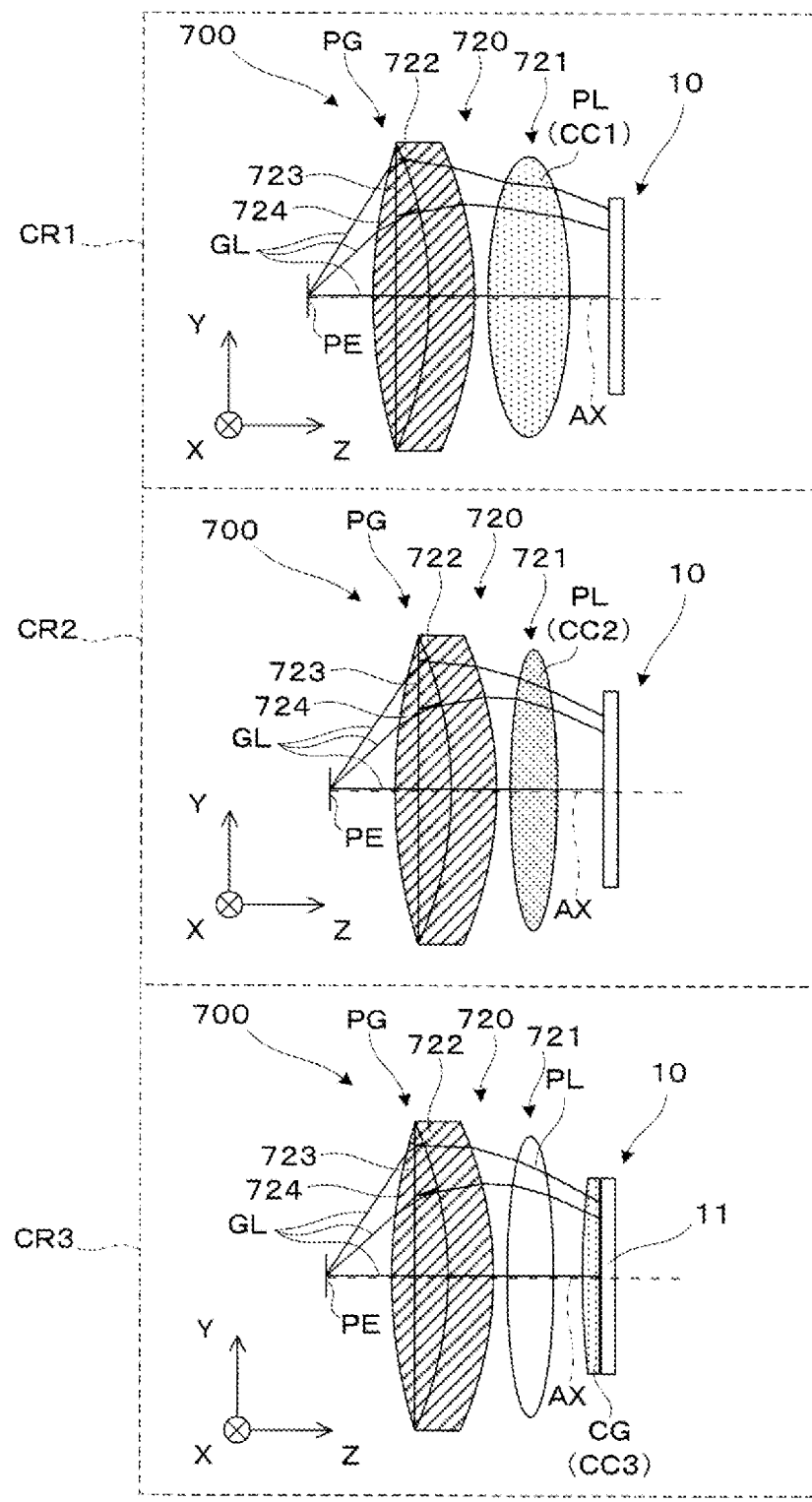
FIG. 11 is a side cross-sectional view for conceptually describing an HMD of a modification.

Further, while, in the example in FIG. 10, in the optical system described above, the colored optical member CO is employed as the cemented lens PG, and the coloring correction optical member CC is employed as the lens PL, various modification forms can be used here as well. For example, in FIG. 11, the example in FIG. 10 is illustrated in a first region CR1 with the projection lens 721 (lens PL) used as the coloring correction optical member CCA. In contrast, however, as illustrated in a second region CR2, the coloring correction optical member CC2 having a greater degree of coloration than that of the coloring correction optical member CC1 may be employed as the projection lens 721 (lens PL), thereby making the lens PL thinner and thus reducing the size of the device. Alternatively, as illustrated in a third region CR3, the lens PL may be configured to employ a regular lens having optical transparency that is not involved in coloring or correction thereof, and the cover glass CG may be a coloring correction optical member CC3.

In this exemplary embodiment as well, by employing the colored optical member CO having a yellowness of a predetermined value or greater, it is possible to employ a member having a high refractive index, and thus reduce the size and weight of the device and achieve a wide angle of view of the image. On the other hand, by including the coloring correction optical member CC, it is possible to avoid, suppress, or the like image degradation caused by the colored optical member CO. In particular, in this exemplary embodiment, the light path length is easily adjusted.

Modifications and Other Matters

The structure described above is exemplary, and various modifications can be made to the extent that similar functions can be achieved. For example, each of the exemplary embodiments described above can be configured in combination as appropriate and necessary. For example, while the above describes a case in which the coloring correction optical member CC is a lens (lens PL or the like) constituting the optical system on the light path of the imaging light GL and a case in which the coloring correction optical member CC is the protective glass CG provided to the display element, that is, the image display device 10, the present invention is not limited to only one of these being used as the coloring correction optical member CC, and a combination in which both the lens PL and the protective glass CG are used as the coloring correction optical member CC, for example, is also conceivable.

Figure 12:
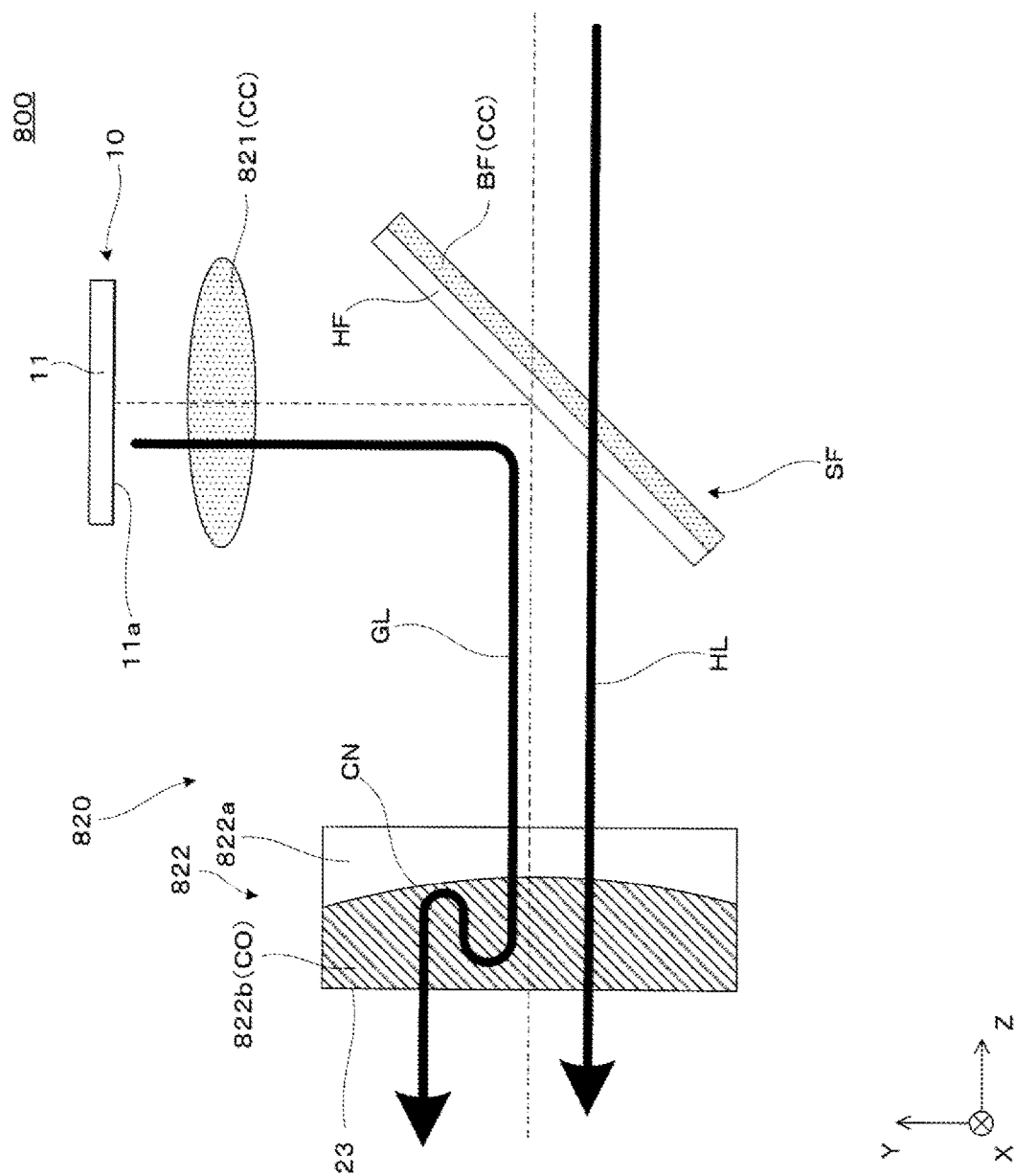
FIG. 12 is a conceptual view illustrating another example of the HMD.

Further, for example, while, in the exemplary embodiments described above, a so-called closed-type configuration has been described in which an image display of virtual reality (VR) is visually recognized, the present invention is not limited thereto and, for example, a so-called see-through type, that is, a type that allows the user to visually recognize or observe an external world image in a see-through manner as in the example illustrated in the conceptual view of FIG. 12 is also conceivable. An HMD 800 of the example illustrated in FIG. 12 includes a synthetic filter SF in addition to the image display device 10, an enlargement optical system 820, and the transmission/reflection selection member 23. The enlargement optical system 820 includes a projection lens 821 as the coloring correction optical member CC, and a cemented lens 822 including the colored optical member CO. Note that, in the example illustrated, of a concave lens 822a, a convex lens 822b, and the like constituting the cemented lens 822, the convex lens 822b is the colored optical member CO. The synthetic filter SF is disposed between the projection lens 821 and the cemented lens 822 on the light path of the imaging light GL, reflects the imaging light GL to bend the light path, transmits external light HL, and superposes an external world image on the image provided by the image display device 10, thereby forming a see-through state. Note that, the synthetic filter SF is, for example, constituted by the half mirror HF and a blue filter BF, as illustrated. Of these, the half mirror HF reflects a portion of the imaging light GL from the projection lens 821, bends the light path, and transmits a portion of the external light HL. That is, the light path of the imaging light GL to be visually recognized is combined with the external light HL. On the other hand, the blue filter BF provided on the outer side of the half mirror HF performs coloring correction in advance in anticipation that the external light HL passes through the colored optical member CO. In other words, the blue filter BF functions as the coloring correction optical member CC for the external light HL.

Further, the techniques of the claimed disclosure may also be compatible with a so-called see-through product constituted by a display and an imaging device.

Further, in the above description, the image display device 10 is, for example, configured with a self-light-emitting type element (OLED) such as organic EL, but in this case, for example, one that emits circularly polarized imaging light may be employed, and the polarization plate or the quarter wavelength plate may be omitted. In this case, optical members no longer required may not be provided.

Additionally, occurrence of ghost light or the like may further be suppressed by appropriately providing anti-reflective (AR) coating in a lens surface of each lens.

Additionally, the techniques of the present disclosure are applicable to a binocular type handheld display or the like.

Additionally, in the above description, as for a location in which the half mirror HM including the semi-reflective and semi-transmissive film configured to transmit a portion of imaging light and reflect another portion is provided, for example, it is also conceivable that a function equivalent to an action by the half mirror HM is obtained by providing an optical function surface such as a diffraction element, for example, a volume hologram, instead of the half mirror.

As described above, a head-mounted display according to an aspect of the present disclosure includes a display element configured to display an image, a colored optical member disposed on a light path of imaging light emitted from the display element and having a yellowness of a predetermined value or greater, and a coloring correction optical member configured to correct a degree of coloring of the imaging light of the entire light path in accordance with the yellowness of the colored optical member.

In the HMD described above, the colored optical member disposed on the light path of the imaging light and having a yellowness of a predetermined value or greater is employed as an optical member, making it possible to employ a member having a high refractive index. That is, it is possible to reduce the size and weight of the device, and to achieve a wide angle of view of the image. On the other hand, the HMD is provided with the coloring correction optical member, thereby avoiding or suppressing deterioration of the image caused by the colored optical member. Further, in this case, the burden of image processing can be reduced compared to a method in which image quality is maintained by image processing using the panel constituting the display element or the like, for example.

According to a specific aspect of the present disclosure, the yellowness in the colored optical member is 10 or greater. In this case, for example, a member having a high refractive index yet high yellowness can be employed as portion of the optical system constituting the HMD.

According to another aspect of the present disclosure, the colored optical member is a high refractive index member having a refractive index higher than indices of other optical members disposed on the light path of the imaging light. In this case, an image having a wide angle of view can be formed.

According to yet another aspect of the present disclosure, the colored optical member and the coloring correction optical member are lenses constituting an optical system on the light path of the imaging light. In this case, for example, the white balance of the display image can be maintained as a whole by using the lenses constituting the optical system on the light path to correct the coloring in one portion while maintaining a high refractive index in the other portion.

According to yet another aspect of the present disclosure, two or more of three or more lenses constituting the optical system constitute the coloring correction optical member. In this case, it is possible to facilitate adjustment of a light path length, and increase a degree of freedom of a base material and a degree of coloration of the lens.

According to yet another aspect of the present disclosure, the coloring correction optical member is a cover glass provided to the display element. In this case, the coloring correction optical member can be reduced in size and, for example, a cost reduction and the like can be achieved.

According to yet another aspect of the present disclosure, the coloring correction optical member is configured to correct the degree of coloring within a range of an angle of view of at least 40° or less. In this case, the white balance can be maintained in a range with high visibility.

According to yet another aspect of the present disclosure, in the coloring correction optical member, the degree of coloring varies depending on the light path of the imaging light. In this case, a degree of correction can be adjusted to suit the light path in accordance with the degree of coloring of the colored optical member.

According to yet another aspect of the present disclosure, the degree of coloring of the coloring correction optical member is defined in accordance with the yellowness of the colored optical member and a light path length of the imaging light passing through the coloring correction optical member and the colored optical member. In this case, it is possible to form an image having more favorable coloring.

In yet another aspect of the present disclosure, the coloring correction optical member is a colored member colored in a complementary color of the colored optical member. In this case, a reliable coloring correction can be made.

In yet another aspect of the present disclosure, the colored optical member and the coloring correction optical member constitute a turning optical system. In this case, the required coloring correction can be made and yet the device is reduced in size.

According to yet another aspect of the present disclosure, the turning optical system includes a convex lens including a convex surface on the display element side, a concave lens disposed closer to the display element than the convex lens and including a concave surface configured to join the convex surface of the convex lens, and a half mirror provided to a joining portion between the convex surface and the concave surface, and the convex lens is the colored optical member. In this case, an image with a well-maintained white balance can be formed and yet a small-size configuration and a wide angle of view are achieved.

In yet another aspect of the present invention, the concave lens is the coloring correction optical member. In this case, the coloring of the convex lens can be corrected in the concave lens.

What is claimed is:

1. A head-mounted display comprising:
    a display element configured to display an image;
    a colored optical member disposed on a light path of imaging light emitted from the display element, and having a yellowness of a predetermined value or greater; and
    a coloring correction optical member configured to correct a degree of coloring in accordance with the yellowness of the colored optical member,
    wherein the colored optical member is a high refractive index member having a refractive index higher than indices of other optical members disposed on the light path of the imaging light,
    wherein the head-mounted display is configured to be mounted on a head of a user,
    wherein the colored optical member and the coloring correction optical member constitute a turning optical system, and
    wherein the turning optical system includes a convex lens including a convex surface on the display element side, a concave lens disposed closer to the display element than the convex lens is and including a concave surface configured to join the convex surface of the convex lens, and a half mirror provided to a joining portion between the convex surface and the concave surface, and the convex lens is the colored optical member.

2. The head-mounted display according to claim 1, wherein
    the yellowness, YI, is determined by YI=100(1.2985X−1.1335Z)/Y in an XYZ color system, and
    the yellowness, YI, of the colored optical member is 10 or greater.

3. The head-mounted display according claim 1, wherein
    the colored optical member and the coloring correction optical member are lenses constituting an optical system on the light path of the imaging light.

4. The head-mounted display according to claim 3, wherein the coloring correction optical member comprises two lenses.

5. The head-mounted display according to claim 1, wherein
    the coloring correction optical member is a cover glass provided to the display element.

6. The head-mounted display according to claim 1, wherein
    the coloring correction optical member is configured to at least correct the degree of coloring within a range of an angle of view of 40° or less.

7. The head-mounted display according to claim 1, wherein
    in the coloring correction optical member, the degree of coloring varies depending on the light path of the imaging light.

8. The head-mounted display according to claim 1, wherein
    the degree of coloring of the coloring correction optical member is defined in accordance with the yellowness of the colored optical member and a light path length of the imaging light passing through the coloring correction optical member and the colored optical member.

9. The head-mounted display according to claim 1, wherein
    the coloring correction optical member is a colored member colored in a complementary color to the colored optical member.

10. The head-mounted display according to claim 1, wherein the concave lens is the coloring correction optical member.

* * * * *